(12) United States Patent
Holden et al.

(10) Patent No.: US 6,706,244 B1
(45) Date of Patent: Mar. 16, 2004

(54) APPARATUS AND METHODS FOR EVALUATING THE QUALITY OF A COMBINATORIAL LIBRARY OF COMPOUNDS

(75) Inventors: Frank R. Holden, Belmont, CA (US); William L. Fitch, Palo Alto, CA (US); Kenneth C. Lewis, Durham, NC (US)

(73) Assignee: Glaxo Wellcome Inc., Research Triangle Park, NC (US)

( * ) Notice: Subject to any disclaimer, the term of this patent is extended or adjusted under 35 U.S.C. 154(b) by 0 days.

(21) Appl. No.: 09/223,096

(22) Filed: Dec. 30, 1998

(51) Int. Cl.⁷ .............................. B01L 3/00; C08F 2/00
(52) U.S. Cl. ................... 422/99; 422/129; 422/131
(58) Field of Search ..................... 422/99, 131, 129

(56) References Cited

U.S. PATENT DOCUMENTS

| | | | | |
|---|---|---|---|---|
| 5,716,584 A | * | 2/1998 | Baker et al. | 422/131 |
| 5,722,470 A | | 3/1998 | Kedar et al. | |
| 5,770,157 A | * | 6/1998 | Cargill et al. | 422/99 |
| 5,792,431 A | | 8/1998 | Moore et al. | |
| 5,846,839 A | | 12/1998 | Gallop et al. | |

FOREIGN PATENT DOCUMENTS

WO  WO 00/26096  5/2000

OTHER PUBLICATIONS

Geysen et al. (1996), "Isotope or mass encoding of combinatorial libraries," Chemistry & Biology 1996, vol. 3, No. 8, pp. 679–688.

Jacobs et al. (1998), "Encoded combinatorial chemistry," in Combinatorial Chemistry and Molecular Diversity in Drug Discovery, Gordon and Kerwin, eds., pp. 271–290.

Lewis et al. (1998), "Characterization of a split–pool combinatorial library," LC . GC, vol. 16, No. 7, pp. 644–649.

Ni et al. (1996), "Versatile approach to encoding combinatorial organic syntheses using chemically robust secondary amine tags," J. Med. Chem. 39:1601–1608.

Fisher Scientific Catalogue pp. 1683–1685, 1993/1994.*

* cited by examiner

*Primary Examiner*—Bennett Celsa
(74) *Attorney, Agent, or Firm*—Townsend and Townsend and Crew LLP

(57) ABSTRACT

Devices and methods are provided to facilitate the evaluation of the quality of a combinatorial library of compounds. One exemplary device comprises a holding plate having an array of apertures. A plurality of vials are removably held within the apertures. Each of the vials has an open top end. A seal member is disposed over the top ends of the vials, and a top plate is removably coupled to the holding plate to force the seal member against the top ends of the vials.

1 Claim, 3 Drawing Sheets

APPARATUS AND METHODS FOR EVALUATING THE QUALITY OF A COMBINATORIAL LIBRARY OF COMPOUNDS

BACKGROUND OF THE INVENTION

This invention relates generally to the field of quality control, and in particular to the quality control of a combinatorial library of compounds. More specifically, the invention relates to apparatus and methods for evaluating the quality of a library of compounds, typically produced by encoded split-pool synthesis.

The split-pool approach for solid phase synthesis is often used to rapidly create large, diverse chemical libraries of potential therapeutic compounds. This approach yields single beads of solid phase support to which a few hundred picomolecules of product compound are tethered. After synthesis, a pool of beads often can contain several thousand compounds.

It is desirable to verify the success of the synthesis before screening the library against biological targets. Although the library may be tested for activity in a high throughput screen in the event the library synthesis does not proceed as expected, the probability of identifying active compounds in this manner is very low. Even worse, an active component may turn out to be an unexpected (and irreproducible) side product.

Split pool synthesis is a method of producing a large number of compounds utilizing a minimal number of reaction steps in multiple reaction vessels. Exemplary split pool synthesis processes are described in U.S. Pat. Nos. 5,846,839 and 5,503,805; and in Kenneth C. Lewis et al., "Characterization of a Split Pool Combinatorial Library," LCGC, Vol. 16, No. 7, pp. 644–649, July 1998; and Z. Ni et al., "A Versatile Approach To Encoding Combinatorial Organic Synthesis Using Chemically Robust Secondary Amine Tags," J. Med. Chem., 39:1601–1608 (1996). The complete disclosures of all of these references are herein incorporated by reference.

Merely by way of example, one exemplary synthesis process proceeds by attaching a photo cleavable linking compound to 90% of the amines on the bead surface while protecting the remaining amino groups with N-(allyloxycarbonyl)(Alloc). The beads are split into 35 pools and the first building block is attached to the photo-linking compound. Dailkylamine tags for the first building block are attached to the 10% residual amines. The beads are pooled and resplit to attach the second building block. Dailkylamine tags for the second building block are attached, and the beads are pooled and resplit to attach the third building block set to the scaffold. The 35 samples are then stored as separate subpools of the library. In this way, each resulting bead contains a desired compound and a series of dailkylamine tags that serve as a record of the synthesis procedure.

The quality control of split pool libraries presents a variety of challenges to analytical chemists. First, such libraries provide a limited amount of compound. For example, the actual amount of compound can vary from less than 50 pmol to more than 1 nmol depending on the size and type of bead used as the solid support. Merely by way of example, some processes may utilize 130 μm $d_p$ Tentagel beads (Nova Biochem, San Diego, Calif.), which can be loaded to approximately 400 pmol/bead. However, the actual loading on such beads is often less due to the variations in bead size, synthetic yield and efficiency of cleavage.

Another set of problems occurs after the sample is separated from the bead. Such problems can include those relating to contamination, adsorption, and the transfer of small volumes. Because the sampling of a split pool library is random, chemists must analyze enough beads to obtain meaningful statistics about the library. Therefore, the analysis method must handle limited quantities of sample in a high throughput manner.

Hence, it would be desirable to provide devices and methods to facilitate the evaluation of the quality of a library of combinatorial compounds. Such devices and methods should be able to handle limited quantities of sample in a high throughput manner. As such, the devices and methods should be compatible with existing analysis and fluid handling equipment. Further, the devices and methods should be efficient to reduce the time required to evaluate the quality of the library.

SUMMARY OF THE INVENTION

The invention provides exemplary devices and methods for evaluating the quality of a combinatorial library of compounds. One exemplary device comprises a holding plate having an array of apertures. A plurality of vials are removably held within the apertures, with each vial having an open top end. A seal member is disposed over the top ends of the vials, and a top plate is removably coupled to the holding plate to force the seal member against the top ends of the vials. Such a device is particularly advantageous in that it provides a way to keep the beads in a sealed environment during both ligand cleavage and tag cleavage. In this manner, the beads do not need to be transferred to separate vials during a quality control process. For example, following ligand cleavage, the tags are typically released for analysis by acid hydrolysis. This step typically requires the beads to be heated. By utilizing the device of the invention, the beads may remain within the same vials used for ligand cleavage, and simply placed in an oven during the hydrolysis process.

Conveniently, the device may further include a bottom plate having a cavity for receiving bottom ends of the vials. Preferably, the bottom plate has a standard footprint to allow the device to be utilized with automated equipment, such as autosamplers. In a similar manner, the apertures in the holding plate are preferably spaced apart to correspond to a standard multi-well plate format, e.g., the 96-well format. In this manner, automated equipment may also be used to introduce and remove fluids from the vials. In this manner, the time to perform the quality control process is greatly reduced.

The top plate and the holding plate are preferably constructed of a rigid material that is resistant to acids. For example, the top plate and holding plate may be constructed of an anodized aluminum. Conveniently, a plurality of screws may be provided to removably couple the top plate to the bottom plate. In still another aspect, the seal member preferably comprises a resilient sheet having the same dimensions as the holding plate. The resilient sheet preferably includes a layer of PTFE and the vials are preferably constructed of glass so that the sheet and the vials will be compatible with the ligand and tag cleavage processes.

In still yet another aspect, the top plate includes a plurality of through holes which are aligned with the vials when the top plate is coupled to the holding plate. In this way, the seal member may be pierced and fluids within the vials extracted through the through holes. Optionally, a resilient pad may be disposed adjacent the holding plate and has openings which correspond to the apertures of the holding plate. The resilient pad is useful in protecting the vials from breaking when the device is assembled.

The invention further provides an exemplary method for evaluating the quality of a combinatorial library of compounds. According to the method, a device is provided which comprises a holding plate and a plurality of vials that are held by the holding plate. At least one solid support is placed into at least some of the vials. Each solid support has a ligand and encoded tags. The solid supports are then sealed within the vials. Once sealed, the ligand is cleaved from the solid supports, and a ligand sample is removed from the vials. Following the ligand cleavage, the encoded tags are cleaved from the solid supports. To cleave the encoded tags, the vials are preferably heated while the solid supports are sealed within the vials. Samples of the cleaved tags are then removed from the vials. The ligand is then compared to a structure indicated by the tags for each solid support.

To seal the solid supports within the vials, a seal member is preferably placed over the vials and a top plate is coupled to the holding plate to force the seal member against the vials.

In one particular aspect, a photo-cleavage process is employed to cleave the ligands from the solid support. Conveniently, the vials may be turned upside-down and then placed under a lamp to photo-cleave the ligands. When the vials are turned upside-down, the solid supports remain within the bottom ends of the vials due to the surface tension of the fluids with the vials.

In another aspect, the top plate has through holes which are aligned with the vials. In this manner, the seal member is pierced to extract the ligand sample from the vials.

In yet another aspect, the encoded tags are cleaved by first removing the top plate and the seal member and introducing a cleaving solution, such as hydrochloric acid, into the vials. A fresh seal member is then placed over the vials and the top plate is replaced to seal the solid supports within the vials. Once properly sealed, the device is transferred to an oven where the vials are heated. Following heating, the top plate and the seal member are preferably removed to allow the cleaving solution to be dried. For example, the device may be placed in a vacuum oven to dry the hydrochloric acid.

Following drying of the cleaving solution, a solvent, such as acetonitrile is introduced into the vials. The top member and the seal member are then replaced. To remove the cleaved tags from the vials, the seal member is pierced and a sample is extracted. Preferably, the ligand sample and the samples of the cleaved tags are evaluated using mass spectrometry. These results are then compared to determine the quality of the combinatorial library of compounds.

DETAILED DESCRIPTION OF THE SPECIFIC EMBODIMENTS

The invention provides exemplary devices and methods for evaluating the quality of a combinatorial library of compounds. In this way, the quality of a library may be determined by analyzing a population of single beads representative of the entire library prior to biological screening of the encoded library. The combinatorial library of compounds is preferably obtained using a split pool synthesis process, such as the processes previously described in the Background section of this application. However, it will be appreciated that the device and methods of the invention may be useful with any combinatorial library of compounds. The invention will finds its greatest use, however, with encoding technologies that utilize dailkylamine tags which are released by acid hydrolysis.

In a particularly preferable aspect, the quality control process involves comparing the ligand on each bead as analyzed by mass spectrometry to the structure indicated by the codes on the particular bead. Conveniently, the code on each bead may also be determined by utilizing mass spectrometry. One particular advantage of the invention is that both ligand cleavage and tag cleavage are accomplished while the beads remain within the same vials. Further, during acid hydrolysis where tag cleavage occurs, the invention provides for placing the vials in a heated environment to facilitate the hydrolysis process. By performing both ligand cleavage and tag cleavage while the beads are within the same vials, the time to complete the quality control process is greatly reduced since no transferring of beads is required. Another advantage of the invention is that the vials are preferably arranged according to standard, well accepted formats. For example, the vials may be placed in a standard 96-well format. In this way, automated equipment may be used to facilitate the quality control process, including robots, auto-samplers, and the like. In this manner, the time to complete the quality control process is further reduced.

Figure 1:
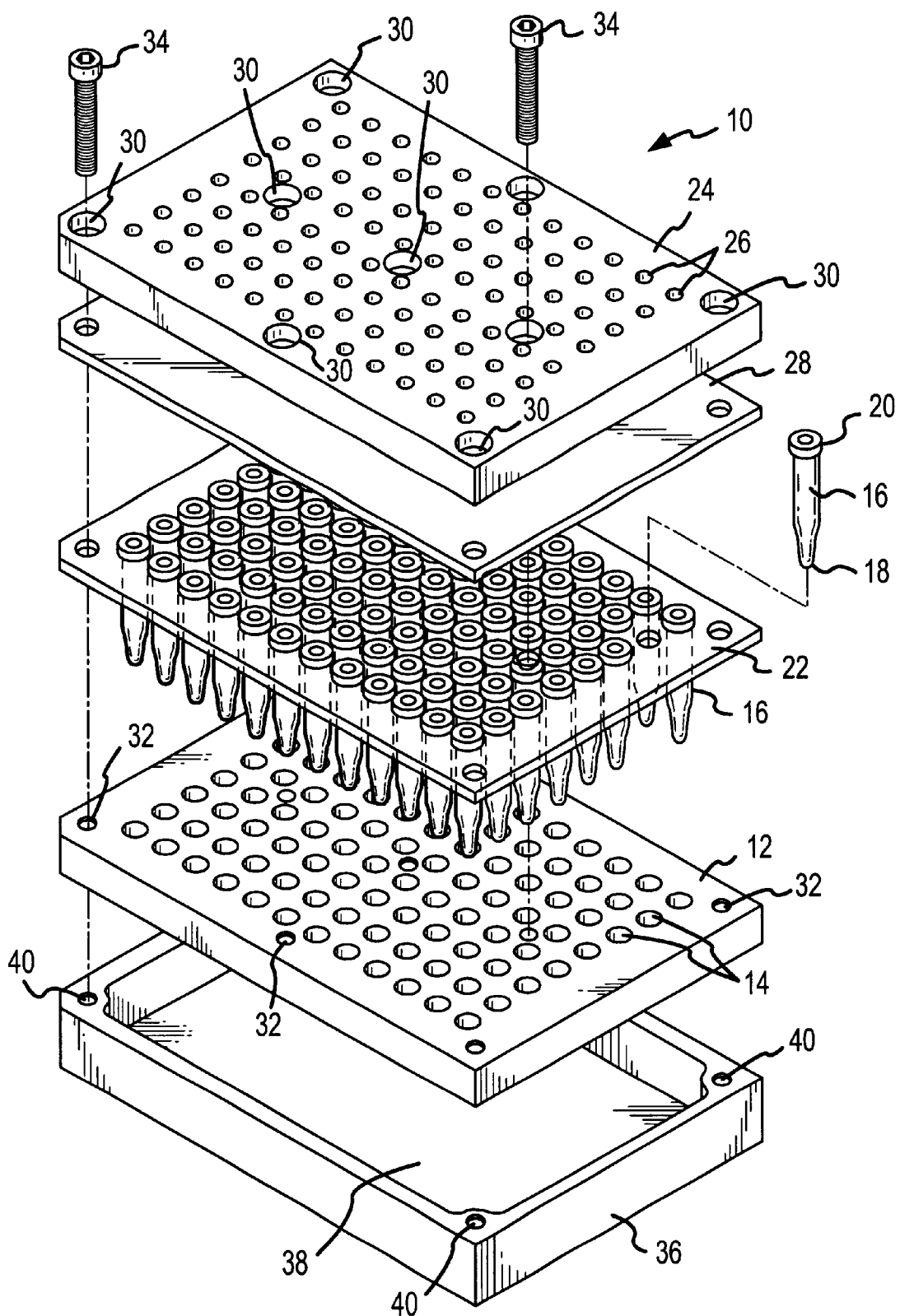
FIG. 1 is an exploded perspective view of an exemplary device for evaluating the quality of a combinatorial library of compounds according to the invention.

Referring now to FIG. 1, an exemplary device 10 that may be utilized when evaluating the quality of a combinatorial library of compounds will be described. Device 10 is constructed of a holding plate 12 having a plurality of apertures 14 which extend through holding plate 12. Apertures 14 are each configured to receive a vial 16. Holding plate 12 preferably has a thickness that is small enough so that a bottom end 18 of vial 16 projects beyond a bottom surface of holding plate 12. Vials 16 each include an open top end 20 into which beads and other fluids may be placed. When vials 16 are inserted into apertures 14, top ends 20 extend above a top surface of holding plate 12. Preferably, vials 16 are constructed of glass so that they will be compatible with the solvents and solutions used during both ligand cleavage and tag cleavage. Exemplary vials that may be used with the invention include tapered glass micro-vials, part no. C-4008632C, commercially available from National Scientific.

Optionally, a resilient pad 22 may be placed on top of holding plate 12 to help prevent vials 16 from breaking when forced against holding plate 12 as described hereinafter. Pad 22 also includes a plurality of apertures which are aligned with apertures 14 of holding plate 12. Exemplary materials that may be used to construct resilient pad 22 include rubber, soft plastics, and the like. Optionally, apertures 14 may be chamfered at the top surface of holding plate 12 so that resilient pad 22 is not needed.

Positioned above holding plate 12 is a top plate 24. Top plate 24 includes a plurality of through holes 26 to allow access to vials 16 through top plate 24. Positioned between top plate 24 and top ends 20 of vials 16 is a seal member 28. When seal member 28 is forced against open top ends 20, it forms a seal at each open top end 20. In this way, the contents within vials 16 are sealed from the external environment. A variety of materials may be employed to construct seal member 28, with a necessary requirement being that seal member 28 is sufficiently resilient to form a seal at open top ends 20. One particularly preferable way to construct seal member 28 is by combining a silicon rubber sheet with a PTFE sheet. Merely by way of example, the silicon rubber sheet may be approximately 0.050 inches thick and the PTFE sheet approximately 0.005 inches thick. Seal member 28 is positioned such that the PTFE side is placed adjacent to open top ends 20.

Top plate 24 also includes a plurality of holes 30 which are aligned with threaded holes 32 in holding plate 12. Corresponding holes are also included in seal member 28 and resilient pad 22. In this way, screws 34 may be inserted through holes 30 and into holes 32 to secure top plate 24 to holding plate 12. As screws 34 are tightened, top plate 24 forces seal member 28 against open top ends 20 of vials 16. As previously described, pad 22 assists in preventing the glass vials from being crushed and broken. Top plate 24 and holding plate 12 are preferably constructed of a rigid material so that they will generally not flex as screws 34 are tightened. Exemplary materials that may be used to construct top plate 24 and holding plate 12 include anodized aluminum, stainless steel, ceramics, and the like. Further, top plate 24, seal member 28, pad 22, and holding plate 12 are preferably all constructed of heat-resistant materials to allow device 10 to be placed in an oven during hydrolysis as described hereinafter.

In summary, top plate 24 may be secured to holding plate 12 to provide a seal over each of vials 16. Access to vials 16 may be made simply by removing top plate 24 and seal member 28 or simply by piercing through seal member 28 through holes 26. If the latter option is chosen, the pierced seal member may be replaced simply by removing top plate 24 and inserting a fresh seal member.

Holding plate 12 is preferably configured so that apertures 14 are arranged in a standard format. In this way, device 10 may be utilized with automated equipment, such as robots, autosamplers, and the like. As shown, holding plate 12 is configured in a standard 96-well format. However, it will be appreciated that other arrangements may be possible.

Device 10 further includes a bottom plate 36 which defines a cavity 38. Bottom plate 36 also includes a plurality of holes 40 into which screws 34 are received when holding plate 12 is placed onto bottom plate 36. When assembled, bottom ends 18 of vials 16 protrude into cavity 38. Preferably, bottom plate 36 is constructed of a rigid material and thus provides a degree of protection to the glass vials. Bottom plate 36 preferably has a geometry which is patterned after standard plate formats to enable device 10 to be used with automated equipment as previously described. For example, many robots are configured to accommodate standard sized plates. By utilizing bottom plate 36, device 10 is useful with such equipment without modification.

Figure 2A:
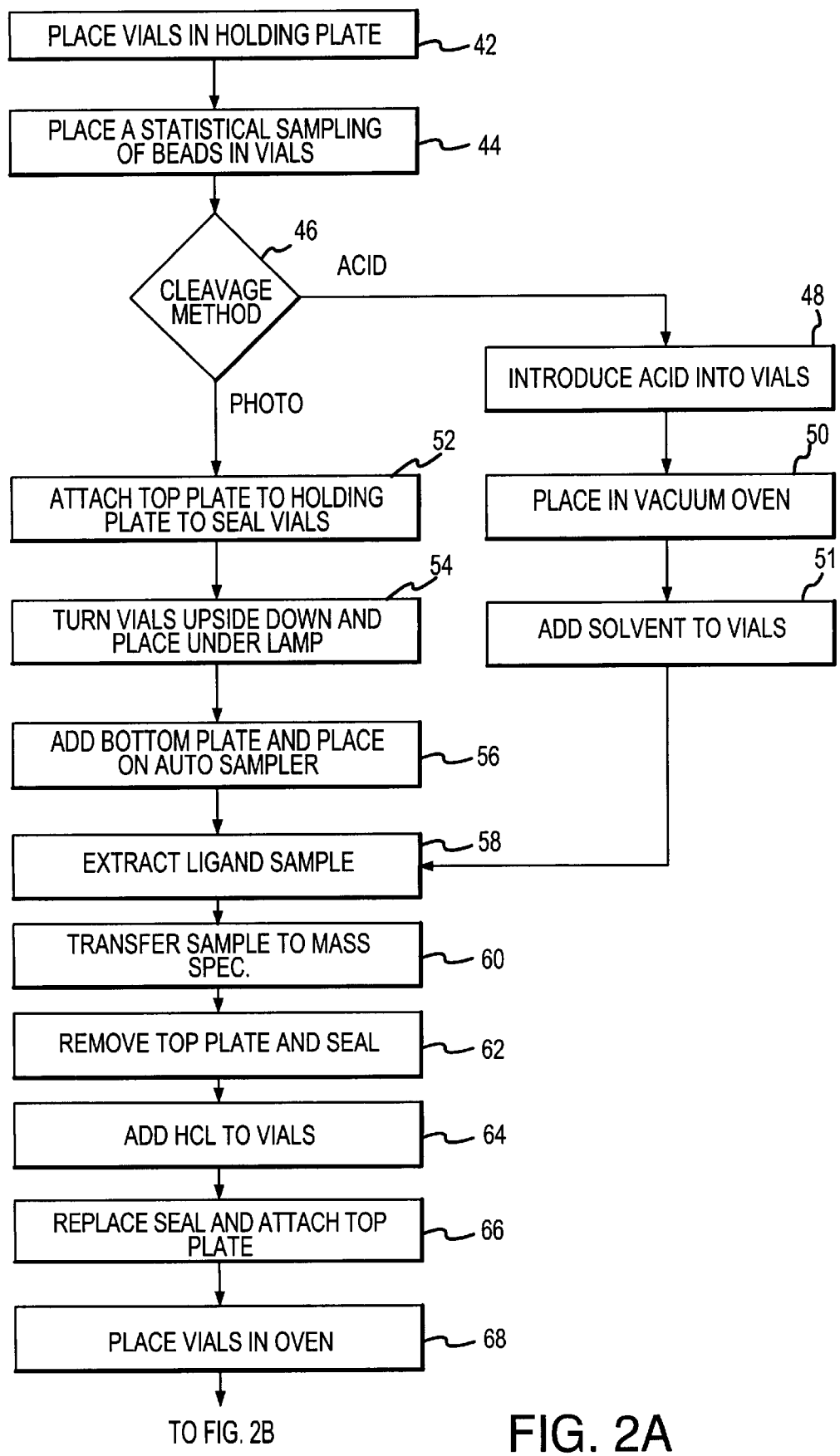
FIGS. 2A and 2B illustrate an exemplary method for evaluating the quality of a combinatorial library of compounds utilizing the device of FIG. 1.
Figure 2B:
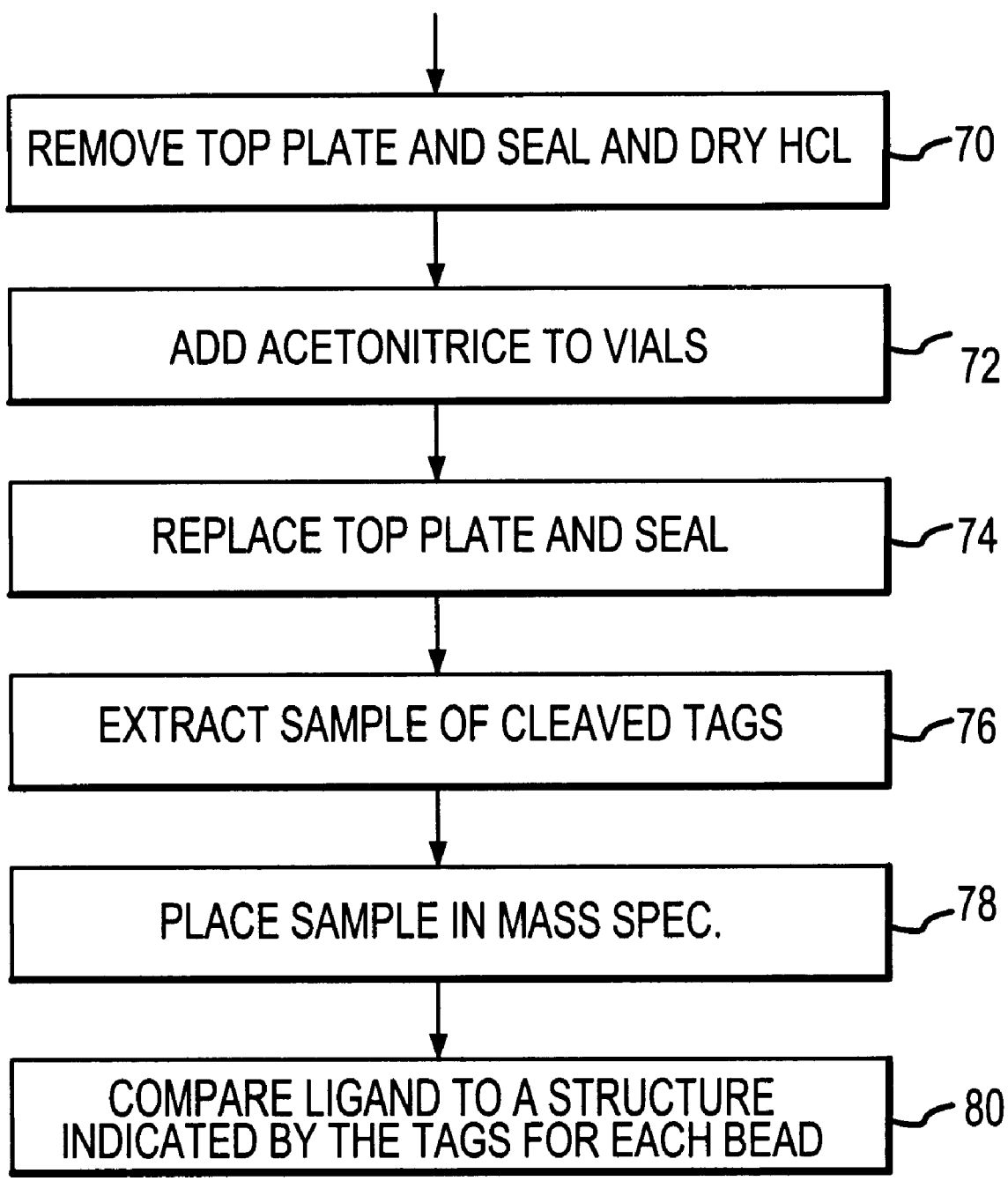

Referring now to FIGS. 2A and 2B, an exemplary method for evaluating the quality of a combinatorial library of compounds will be described. Conveniently, reference will also be made to device 10 of FIG. 1 when describing the method. Initially, a sample of beads is selected from the combinatorial library so that they may be analyzed to generate meaningful statistics that reflect the quality of the library. The number of beads sampled is preferably about three times the largest building block set. Merely by way of example, a thiazolidinone library may be constructed using three chemical steps. Thirty-five members are utilized with each of the three building block sets. In this way, the resulting library contains 42,875 members ($35^3$) For this example, the number of samples to be evaluated would be 105 beads/pool (3×35).

As shown in FIG. 2A, the method begins by placing vials 16 into holding plate 12 as described in step 42. A statistical sampling of beads is then placed into vials 16 as described in step 44. Preferably, each of vials 16 is filled with water prior to transferring the beads. Conveniently, the beads may be transferred into vials 16 using an automated bead-picker. For example, one such bead-picker that may be utilized with device 10 is described in U.S. Pat. No. 5,722,470, the complete disclosure of which is herein incorporated by reference. Conveniently, bottom plate 36 may include various holes in its bottom side to allow device 10 to be properly positioned on the bead-picking apparatus. Preferably, each vial 16 receives a single bead. However, in some cases, more than one bead may be placed into each vial. Once the beads are within vials 16, the water is removed from vials 16 and the vials are dried. Conveniently, a fluid handling apparatus, such as a Hydra 96 device, commercially available from Robbins Scientific, may be employed to remove the water from vials 16. Device 10 is then placed in a vacuum drier to dry any remaining water.

As described in step 46, ligand cleavage may be accomplished using an acid cleaving process or a photo cleaving process. For acid cleavage, an acid, such as TFA, is introduced into each of vials 16. After a predetermined time has passed, such as approximately one-half hour, vials 16 are placed in a vacuum oven as described in steps 48 and 50. A solvent, such as acetonitrile, is then added to the vials (see step 51) to allow samples to be removed from the vials as described hereinafter in step 58.

If the photo cleavage option is chosen, a solvent, such as methanol, is introduced into each vials 16. Seal member 28 and top plate 24 are then attached to holding plate 12 to seal the methanol and beads within vials 16, as described in step 52. Device 10 is then positioned by a light source to cleave the ligands from the beads. As one example, photo cleavage may occur by placing vials 16 beneath a 500 UV mercury/vapor discharge lamp. However, other light sources may also be used. Optionally, holding plate 12 may be turned upside-down so that bottom ends 18 of vials 16 are positioned vertically upward. Due to the tapered nature of vials 16 and the fluid tension of the methanol, the methanol and bead stays within bottom ends 16. Typically, about 25 to about 30 microliters of methanol is inserted into vials 16 so that only a small amount of methanol will be at bottom ends 18. The turning of holding plate 12 in an upside-down configuration is advantageous in that it conveniently exposes the beads within vials 16 to the lamp (it being appreciated that bottom plate 36 is not employed during photo cleavage). This is described in step 54 of FIG. 2A. Preferably, vials 16 are held under the lamp for about two hours to cleave off the ligand.

As described in step 56, bottom plate 36 is then coupled to holding plate 12 and device 10 is placed in an auto-sampler to extract samples of the ligand from each of the vials as described in step 58. An exemplary auto-sampler that may be employed is a Leap Technologies HTS PAL Auto-sampler, commercially available from Leap Technologies. The auto-sampler has a needle which is separately inserted through each through hole 26, through seal member 28 and into vials 16 where the sample is extracted. Alternatively, an auto-sampler having an array of needles may be employed. As described in step 60, the auto-sampler then transfers the sample to a mass spectrometer which analyzes the sample. Attachment of bottom plate 36 to holding plate 12 is advantageous in that it properly positions device 10 within the auto-sampler. In this way, the needles will be properly positioned so that they may be inserted through the through holes. An exemplary mass spectrometer which may be utilized with the invention is a LC-MSD, Series 1100 spectrometer, commercially available from Hewlett-Packard.

Following removal of the ligand sample, top plate 24 and seal member 28 are removed from holding plate 12 as illustrated in step 62. A cleaving solution, such as hydrochloric acid, is then introduced into each of vials 16 to cleave the tags from the beads, as described in step 64. Because the seal member was previously pierced, it is replaced with a new seal member, and top plate 24 is again secured to holding plate 12 to seal the hydrochloric acid and the beads within vials 16, as described in step 66. Bottom plate 36 is also attached and device 10 is then placed into an oven to begin the hydrolysis process as described in step 68. Preferably, vials 16 are heated to a temperature of about 135° C. for approximately 12 hours. However, it will be appreciated that this temperature and time period may be varied. Conveniently, a Thermolyne 62700 oven may be used. As previously described, the components of device 10 are constructed so that they are compatible with such an elevated temperature.

Following hydrolysis, top plate 24 and seal member 28 are removed as described in step 70 of FIG. 2B. The hydrochloric acid is then dried, preferably by placing holding plate 12 within a vacuum oven. As described in step 72, a solvent is then added to each of the vials to allow the cleaved tags to dissolve within the solvent. In this manner, a convenient way is provided to remove samples of the targets from each of the vials. Preferably, acetonitrile is placed into each of the vials. Top plate 24 and seal member 28 are then adhered to holding plate 12 as described in step 74.

Once the tags have dissolved into the solvent, device 10 is placed back on the auto-sampler which pierces through seal member 28 and extracts a sample of the cleaved tags as described in step 76. These samples are then placed in the mass spectrometer as described in step 78. An exemplary mass spectrometer that may be utilized is a LC-MSD, Series 1100 spectrometer, commercially available from Hewlett-Packard.

As an alternative, following step 70, the tags may be converted to dansyl derivatives as described in Kenneth C. Lewis et al., "Characterization of a Split Pool Combinatorial Library," LCGC, Vol. 16, No. 7, pp. 644–649, July 1998; and Z. Ni et al., "A Versatile Approach To Encoding Combinatorial Organic Synthesis Using Chemically Robust Secondary Amine Tags," J. Med. Chem., 39:1601–1608 (1996), previously incorporated by reference. The method then proceeds with steps 74 and 76. The extracted sample is then placed in LC fluorescence, and step 80 is performed to complete the comparison.

Once the sample containing the tags is placed in the mass spectrometer, the ligand on each bead as analyzed by mass spectrometry is compared to the structure indicated by the codes on the beads as illustrated in step 80. Hence, by utilizing device 10, optimized methods are provided for analyzing dailkylamine tags in encoded, combinatorial chemistry. Because device 10 may be placed within a heated environment, both ligand cleavage and tag cleavage may occur while the beads remain within the same vials. Moreover, by providing device 10 with a standard footprint, it may be utilized with automated processing and handling equipment to further reduce the amount of time required to complete the quality control process.

The invention has now been described in detail for purposes of clarity of understanding. However, it will be appreciated that certain changes and modifications may be practiced within the scope of the appended claims.

What is claimed is:

1. A device for holding vials comprising:

a holding plate having an array of apertures;

a plurality of vials removably held within the apertures, the vials having closed bottom ends and open top ends, each vial further including a lip at the top end to position the top ends of the vials vertically above the holding plate;

a seal member disposed over the top ends of the vials;

a top plate removably coupled to the holding plate to force the seal member against the top ends of the vials; and a resilient pad separate from and placed on top of the holding plate to help prevent the vials from breaking when the seal member is forced against the top end of the vials by the top plate, the resilient pad having openings which correspond with the apertures of the holding plate, the lips of the vials resting on top of the resilient pad with the bottom ends of the vials protruding through the openings in the resilient pad.

* * * * *